(12) United States Patent
Baba et al.

(10) Patent No.: US 6,497,819 B1
(45) Date of Patent: Dec. 24, 2002

(54) METHOD AND APPARATUS FOR TREATING WASTE WATER

(75) Inventors: Kei Baba, Tokyo (JP); Toshiaki Tsubone, Tokyo (JP); Tatsuo Takechi, Tokyo (JP); Shinichi Endo, Tokyo (JP); Yukihiko Okamoto, Tokyo (JP)

(73) Assignee: NKK Corporation, Tokyo (JP)

( * ) Notice: Subject to any disclaimer, the term of this patent is extended or adjusted under 35 U.S.C. 154(b) by 0 days.

(21) Appl. No.: 09/508,410

(22) PCT Filed: Dec. 25, 1998

(86) PCT No.: PCT/JP98/05893

§ 371 (c)(1),
(2), (4) Date: Mar. 13, 2000

(87) PCT Pub. No.: WO99/44950

PCT Pub. Date: Sep. 10, 1999

(30) Foreign Application Priority Data

Mar. 6, 1998 (JP) ............................................ 10-055521
Mar. 6, 1998 (JP) ............................................ 10-055522
Mar. 6, 1998 (JP) ............................................ 10-055523

(51) Int. Cl.[7] ................................. C02F 3/08; C02F 3/02
(52) U.S. Cl. ........................ 210/615; 210/616; 210/620; 210/629; 210/151; 210/220; 210/221.1
(58) Field of Search ................................. 210/615–618, 210/620, 629, 150, 151, 220, 221.1, 221.2, 263

(56) References Cited

U.S. PATENT DOCUMENTS

| | | | |
|---|---|---|---|
| 3,764,525 A | * | 10/1973 | Goodman et al. |
| 4,009,098 A | * | 2/1977 | Jeris ............................ 210/604 |
| 4,521,311 A | * | 6/1985 | Fuchs et al. |
| 4,566,971 A | * | 1/1986 | Reimann et al. |
| 4,663,046 A | * | 5/1987 | Feldkirchner et al. |
| 4,842,732 A | * | 6/1989 | Tharp |
| 5,055,186 A | * | 10/1991 | Van Toever |
| 5,330,652 A | * | 7/1994 | Goldman et al. |
| 5,567,314 A | * | 10/1996 | Chigusa et al. ............. 210/150 |
| 5,578,214 A | * | 11/1996 | Yamasaki et al. |
| 5,618,430 A | | 4/1997 | Fuchs |
| 5,672,270 A | * | 9/1997 | Yoshimura |
| 6,007,712 A | * | 12/1999 | Tanaka et al. |

FOREIGN PATENT DOCUMENTS

| | | |
|---|---|---|
| DE | 3433018 A1 | 3/1986 |
| JP | 51-24066 | 2/1976 |
| JP | 1-35274 | 10/1989 |
| JP | 03 038298 | 2/1991 |
| JP | 3-245898 | 11/1991 |
| JP | 5-269482 A | * 10/1993 |
| JP | 7-51689 | 2/1995 |
| JP | 7-13498 | 3/1995 |
| JP | 7-136679 | 5/1995 |
| JP | 7-185582 | 7/1995 |
| JP | 09 206774 | 8/1997 |

* cited by examiner

Primary Examiner—David A. Simmons
Assistant Examiner—Fred Prince
(74) Attorney, Agent, or Firm—McDermott, Will & Emery

(57) ABSTRACT

A method for treating waste water and a plant designed for preventing the precipitation of carriers under the air blower installed for reaction tank or aeration tank, wherein the plant comprises an aeration tank 1 containing the carriers 2 for growing microorganism for biological treatment of waste water or the subunit 1a joined with the aeration tank through a partition wall 4 including the screen capable of separating the carriers 2, air blower 3 provided for the aeration tank or the subunit of the aeration tank, air bubble generator 5 or submerged stirrer provided under the air blower 3 for creating the flow of water so that the carriers 2 under the blower 3 can be liquidized by the flow of water created by the air bubble generator or the submerged stirrer to prevent the precipitation of the carriers 2 under the air blower 3, whereby not only the precipitation of the carriers under the air blower 3 can be prevented but also the water treatment efficiency and capacity meeting the designed numerical requirements can be maintained and exerted by the aeration tank.

13 Claims, 10 Drawing Sheets

WATER TO BE TREATED

TREATED WATER

WATER TO BE TREATED

TREATED WATER

METHOD AND APPARATUS FOR TREATING WASTE WATER

FIELD OF THE INVENTION

The present invention relates to a waste water treatment method and plant, more particularly to a waste water treatment method and plant designed for biological treatment of the organic and inorganic substances in the waste water for obtaining purified water by using granular carriers formed mainly from a macromolecular substance or an inorganic substance capable of carrying microorganism having water-purifying ability in a inclusively-immobilized form or adhesively-immobilized form or bindingly-immobilized form.

BACKGROUND OF THE RELATED ART

As generally known, the existing waste water treatment plant is available in the forms of the standard activated sludge process reaction tank, immobilized microorganism carrier reaction tank and the like. The immobilized microorganism carrier reaction tank is advantageous over the standard activated sludge process reaction tank in that the microorganism concentration can be maintained at a higher level for decomposing the organic and inorganic substances in the waste water with a higher efficiency. The reaction tank provided with air blower is called an aeration tank.

FIG. 10 is a schematic diagram showing a waste water treatment plant designed for using immobilized microorganism carriers, wherein A is a plan view and B, a cross-sectional view along X-Y line of the plan view. The waste water treatment plant shown in the diagram B of the same figure is a plant comprising an overall air blowing type aeration tank, that is, an aeration tank 1, about 5 m deep, containing immobilized microorganism carriers 2, an air blower 3, for blowing the air covering all over the bottom of the tank, and an air blowing pipe 3a connected to the air blower 3. Normally, the overall air blowing type air blower 3 is installed 200 mm to 600 mm above the bottom of the tank. With this air blower 3, the speed of water flow created by the blow of air from the bottom of the tank is not high enough for producing a stirring effect sufficient for liquidizing the carriers 2, thereby making the carriers 2 tend to precipitate on the bottom of the tank as precipitate 9. The numeral 8 represents the inlet of the waste water to be treated.

The waste water treatment plant shown in FIG. 10 has a shortcoming that the precipitation of the carriers under the air blower 3 causes the formation of a dead space in the aeration tank 1 and the resulting shortage of the carriers necessary for the treatment, which results in the decline of the water treatment capacity of the water treatment plant. In order to prevent the carriers from precipitating under the air blower 3, conventionally employed method has been such as filling the space under the air blower 3 with urethane resin or the like or supplying additional carriers for covering its shortage, thereby preventing the decline of the treatment capacity of the plant.

The method of filling the space under the air blower 3 with the urethane resin or the like, as being a means for preventing the carriers 2 from precipitating under the blower 3, has a shortcoming that this incurs the additional material cost and labor cost for the refill of the urethane resin. Further, since the space under the air blower filled with the urethane resin or the like becomes a dead space, this gives rise to a problem, that is, in order for the reaction tank to maintain a necessary cubic volume, it is necessary for the reaction tank to have a design cubic volume including the dead space, which results in the increase in the construction cost.

Further, such a waste water treatment plant is required to prevent the decline of its treatment capacity by supplying additional carriers corresponding to the carriers precipitated under the air blower 3, and the plant designed in this way gives rise to a problem such as the increase in the cost of carriers as the quantity of the necessary carriers increases. Furthermore, such conventional plant has shortcomings such as the decrease in actually available cubic volume of the reaction tank due to the formation of the dead space under the air blower by being occupied by the precipitate of the carriers, which results in poor treatment effect and resulting poor quality of treated water due to the decomposition of the sludge formed among the spaces of the precipitated carriers.

Thus, the object of the present invention is to resolve the problems as are described above by providing a waste water treatment method and plant capable of preventing the immobilized microorganism carriers from precipitating under the air blower installed with the reaction tank or the aeration tank.

SUMMARY OF THE INVENTION

The first aspect of the invention relates to a waste water treatment method by using an aeration tank containing the carriers capable of growing microorganism for biological treatment of waste water or a subunit of the aeration tank joined with the aeration tank through a partition wall including the screen capable of separating the carriers, an oxygen-supplying air blower for the subunit of the aeration tank and an air bubble generator installed under the air blower, wherein the air bubbles from the air bubble generator is used for creating the flow of the water for liquidizing the carriers under the air blower, thereby preventing the carriers from precipitating under the air blower.

More specifically, the invention relates to a waste water treatment plant comprising an aeration tank containing the carriers for growing the microorganism for biological treatment of waste water or the subunit of the aeration tank joined with the aeration tank through a partition wall including the screen capable of separating the carriers, oxygen-supplying air blower for the aeration tank or the subunit of the aeration tank and submerged stirrer for generating air bubbles to create the flow of water for liquidizing the carriers under the air blower. According to this arrangement, the air bubbles from the air bubble generator creates the water flow to liquidize the carriers under the air blower and remove the carriers on the bottom of the aeration tank under the air blower, thereby maintaining the treatment efficiency required for the aeration tank or reaction tank and the designed treatment performance.

Further, the invention relates to a water treatment plant comprising a plurality of air bubble generators installed under the air blower and arranged in parallel or orthogonally to the direction of the flow of the waste water or along one or both of the side walls of the aeration tank, wherein the precipitation of the carriers can be prevented effectively by generating the air bubbles by the air bubble generators in those places where the carriers are apt to precipitate.

Still further, the invention relates to a waste water treatment plant comprising the air bubble generators installed at equal intervals between any of opposing pairs of the side walls of the aeration tank or the subunit of the aeration tank, wherein the air bubble generators are installed at those places where the carriers are apt to precipitate, thereby enabling the air bubbles to be generated to effectively create the flow of the water that prevents the precipitation of the carriers.

Yet further, the invention relates to a waste water treatment plant comprising the air bubble generators installed at equal intervals of 2 m to 20 m between any of opposing pairs of the side walls of the aeration tank or the subunits of the aeration tank, wherein the flow of the water can be created throughout the space under the air blower and the carriers can easily be set afloat. Further, it is preferable for the air bubble generators to be installed at equal intervals of 2 m to 10 m.

Still further, the invention relates to a waste water treatment plant comprising the air bubble generators provided with an air bubble outlets for discharging the air bubbles towards the bottom of the aeration tank, wherein the suspendibly afloat carriers which tend to precipitate on the bottom of the tank is set afloat by the air bubbles blown towards the bottom of the tank, thereby enabling the carriers to be effectively utilized for the growth of the microorganism which is capable of decomposing the organic macromolecular substance and the like in the waste water.

The second aspect of the invention relates to a waste water treatment method by using an aeration tank containing the carriers of growing microorganism for biological treatment of the waste water or the subunit of the aeration tank joined with the aeration tank through a partition wall including the screen capable of separating the carriers and oxygen-supplying air blower for the aeration tank or the subunit of the aeration tank, wherein submerged stirrer installed under the air blower creating the flow of water to liquidize the carriers for preventing the carriers from precipitating under the air blower.

Further, the invention relates to a waste water treatment plant comprising an aeration tank containing the carriers for growing microorganism for biological treatment of waste water or the subunit of the aeration tank joined with the aeration tank through a partition wall including the screen capable of separating the carriers, oxygen-supplying air blower for the aeration tank or the subunit of the aeration tank and submerged stirrer installed under the air blower. This arrangement provides a plant wherein the carriers under the air blower is liquidized by the flow of the water created by the submerged stirrer to prevent the carriers from precipitating under the air blower, whereby the reaction tank can be kept capable of operating with designed efficiency and designed treatment performance without forming any dead space.

Still further, the invention relates to a waste water treatment plant comprising the submerged stirrers installed at intervals of 2 m to 20 m on the bottom of the tank, wherein the flow of the water can be created throughout the space under the air blower to set all the carriers suspendibly afloat and distributed throughout the tank, thereby enabling the plant to maintain its designed capacity for decomposing the organic macromolecular substance in the waste water.

The third aspect of the invention relates to a waste water treatment method by using an aeration tank containing carriers for growing microorganism for biological treatment of waste water or the subunit of the aeration tank joined with the aeration tank through a partition wall including the screens capable of separating the carriers, oxygen-supplying air blower for the aeration tank or the subunit of the aeration tank and a supply pipe for supplying the water to be treated into the tank for creating the flow of water or circulation of water under the air blower to prevent the precipitation of the carriers under the air blower, wherein the supply pipe is installed under the air blower so that the water to be treated flowing along the bottom of the tank creates the flow of water to liquidize the carriers on the bottom of tank to prevent the precipitation of the carriers.

Further, the invention relates to a waste water treatment method characterized by that the direction of the water to flow on the bottom of the tank or the direction of the circulating water is reverse to the direction of the flow of the treated water, wherein the flow of water to be treated along the bottom of the tank is made reverse to the direction of the flow of treated water to create the circulating flow of water to set the carrier suspendibly afloat for enabling the carriers not only to be kept in contact with the water to be treated for a sufficient length of time but also to be prevented from precipitating, thereby reducing the number of the carriers which are unable to contribute to the biological treatment of the waste water.

Still further, the invention relates to a waste water treatment plant comprising an aeration tank containing the carriers for growing microorganism for biological treatment of waste water or the subunit of the aeration tank joined with the aeration tank through a partition wall including the screen capable of separating the carriers, oxygen-supplying air blower installed under the aeration tank or the subunit of the aeration tank, water supply pipe having a number of outlets for letting the water to be treated flow into the tank and installed under the air blower so as to create the flow of the water reverse to the flow of the treated water, wherein the water supply pipe is installed in the direction of the width of the aeration tank so that the water to be treated discharged from the outlets creates the flow of water or circulation of water reverse in direction to the direction of the flow of the treated water on the bottom of the tank, thereby preventing the precipitation of the carriers.

Yet further, the invention relates to a waste water treatment plant characterized by that the supply pipes are arranged orthogonal to the direction of the flow of the treated water and at intervals of 2 m to 20 m along the direction of the flow of (water) on the bottom of the tank, wherein the flow of the water can be created covering all over the bottom of the tank depending on the size of the tank, thereby preventing the precipitation of the carriers.

PREFERRED EMBODIMENTS OF THE PRESENT INVENTION

Preferred Embodiments of the Present Invention The waste water treatment method and plant as the embodiments of the present invention in terms of 3 main aeration methods will be described below referring to the relevant drawings.

Embodiment 1

FIGS. 1A through FIG. 3 are schematic diagrams showing the waste water treatment plants as the embodiments of the present invention. These embodiments relate to those waste water treatment plants respectively incorporating air blower for supplying oxygen.

Figure 1A:
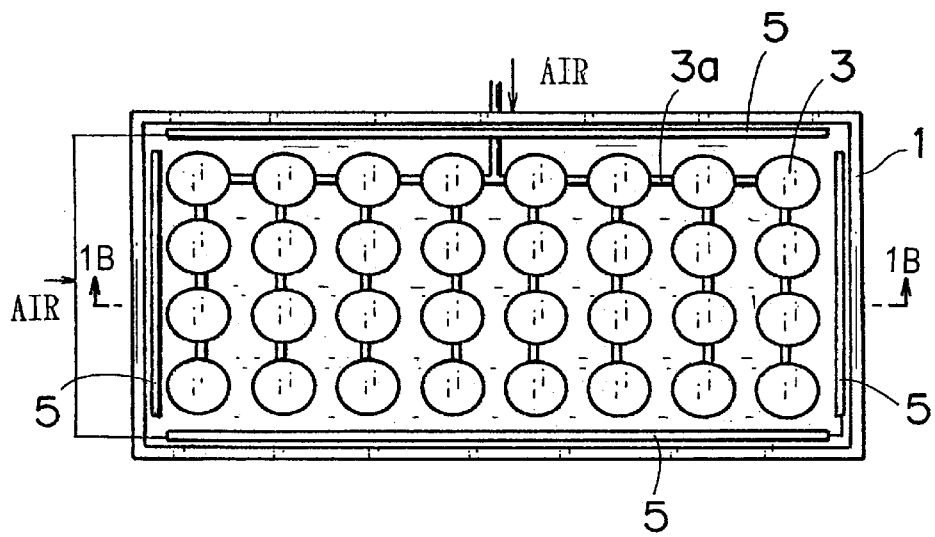
FIG. 1A is a plan view showing a schematic diagram illustrating a waste water treatment plant of a first embodiment of the present invention.
Figure 1B:
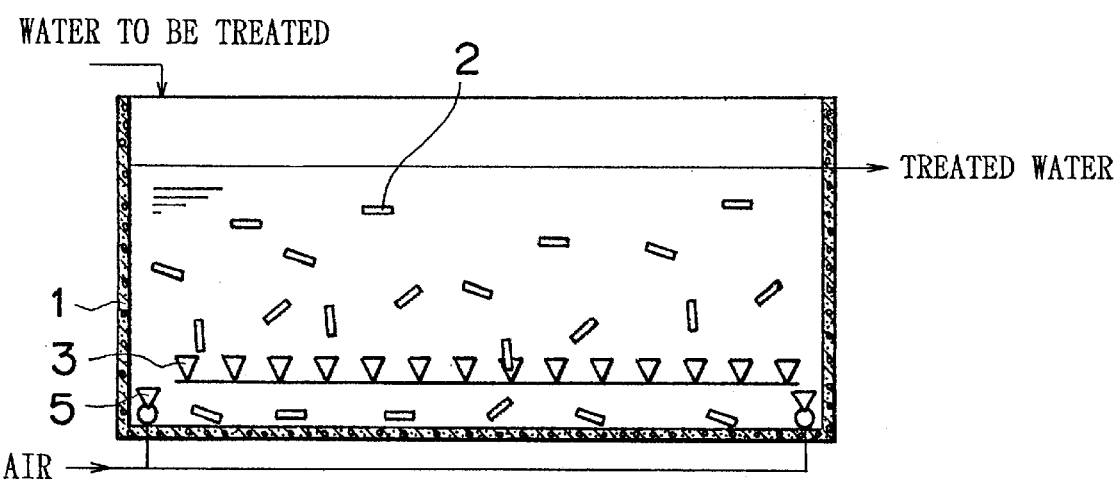
FIG. 1B is sectional view along X-Y line of FIG. 1A.

FIG. 1A is a plan view showing a waste water treatment plant as an embodiment of the present invention and FIG. 1B is a sectional view along X-Y line. As shown in these figures, a waste water treatment plant comprises an aeration tank 1 containing the immobilized microorganism carriers 2, oxygen-supplying air blowers 3, air blowing pipe 3a for supplying air all over the bottom of the aeration tank and connecting the air blowers and air bubble generators 5 installed on the bottom of the aeration tank along each of the side walls of the aeration tank. The immobilized microorganism carriers 2 are granular substance mainly formed from organic or inorganic substance, which are designed for inclusively or bindingly immobilizing the microorganism.

Figure 2A:
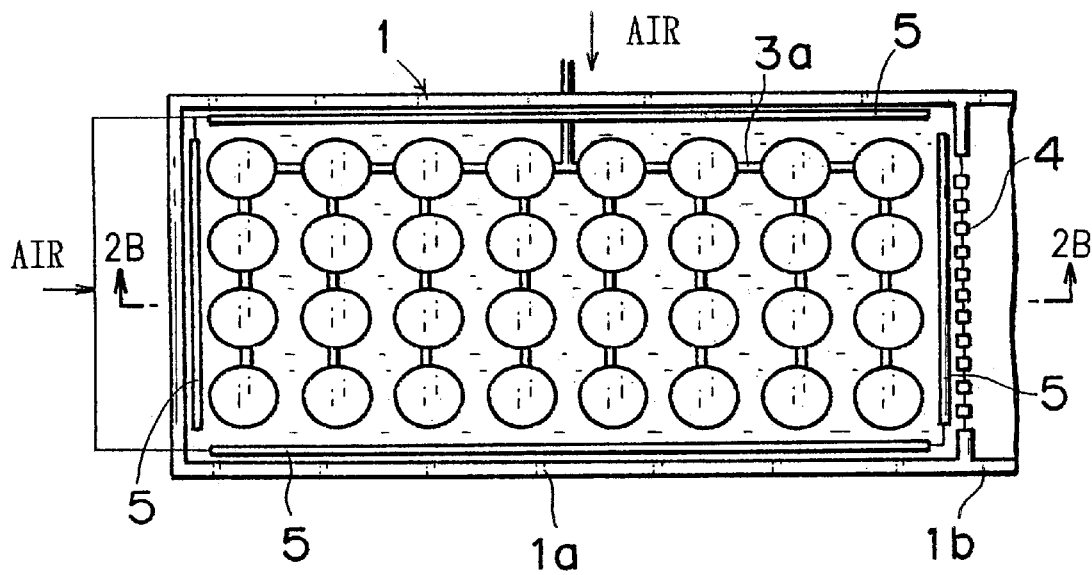
FIG. 2A is a plan view showing a schematic diagram illustrating an aeration tank with subunit as another example of the first embodiment of the present invention.
Figure 2B:
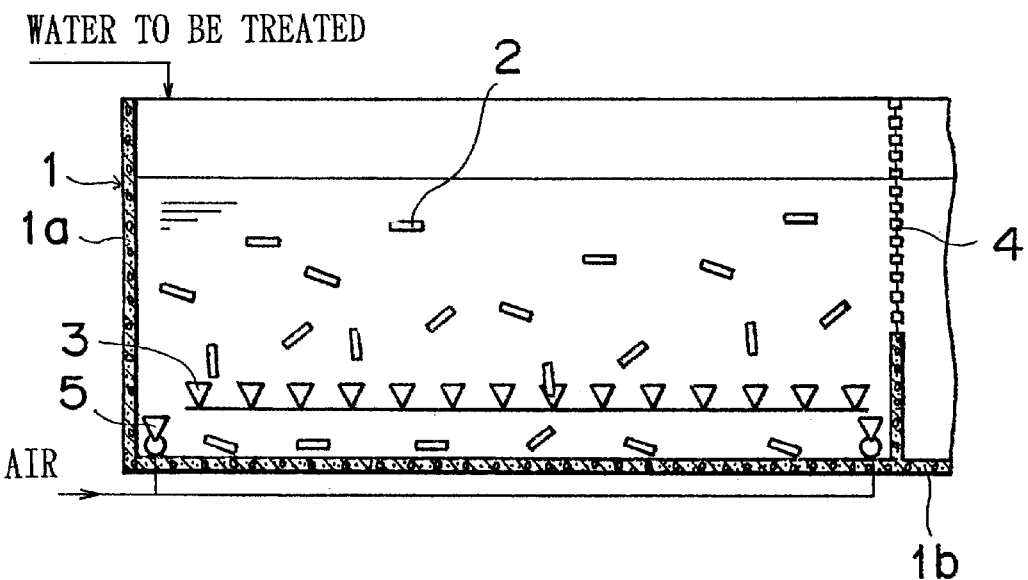
FIG. 2B is a sectional view along X-Y line of FIG. 2A.

FIGS. 2A and 2B show another example of the embodiment 1, wherein FIG. 2A is a plan view and FIG. 2B is a sectional view along X-Y line. As shown in these figures, the aeration tank 1 comprises subunits 1a and 1b. The subunits 1a and 1b are separated by the boundary, that is, a partition wall 4 including the screen for separating carriers form the water to be treated, the subunit 1 being provided for serving as a subunit of the aeration tank. The air blower 3 and the air bubble generator 5 are arranged to the conditions same as those in the case of FIGS. 1A and B.

These embodiments relate to overall air blowing type aeration tank, that is, the aeration tank 1 or the subunit 1a of the aeration tank comprising the air blowers 3 arranged all over the bottom of the aeration tank 1 or all over bottom of the subunit 1a of the aeration tank joined with the aeration tank through the partition wall 4 including the screen capable of separating the carriers 2, wherein the air is supplied from the air blowers 3 for maintaining an environment suited for growing the microorganism with the carriers 2. The air bubble generators 5 are installed under the air blowers 3 but above the bottom of the tank, preferably in a fashion that the air bubbles can be generated at a closest possible level to the bottom of the tank so that an adequate air lift effect of the air bubbles can be obtained for the carriers 2. For example, the air bubble generators 5 are installed in the space under the air blowers 3 at a level, 200 mm to 60 mm from the bottom of the tank, so that the precipitation of the carriers 2 under the air blowers 3 can be prevented by creating the flow of water sufficient to liquidize the carriers 2 under the air blowers 3 by the air lift effect of the air bubbles.

Where the length and width of the aeration tank 1 or those of the subunit 1a of the aeration tank joined with the aeration tank through the partition wall 4 including the screen capable of separating the carriers 2 are within 2 m through 20 m, as shown in FIGS. 1A, 1B and 2A, 2B the flow of water by air bubbles can be created easily by air bubbles in the tank by installing the air bubble generators 5 along the side walls which are parallel to or orthogonal to the direction of the flow of the water to be treated, and, by doing so, sufficient air lift effect can be obtained to prevent the carriers 2 from heavily precipitating on the bottom of the tank.

The amount of the air to be blown by the air bubble generators 5 must be sufficient for liquidizing the carriers 2 under the air blower 3, such amount being about 20–150 l/min./m normally. Further, the form of the air bubble generator 5 may be any of plate-form, disk-form, tube-form or any other forms and may be made from any of ceramic, resin, iron, rubber and composite materials. Further, the pipes with the holes about 1 mm in diameter arranged in its longitudinal direction may also be used. Further, the air bubble generators 5 may be provided with air bubble discharging outlets designed for discharging air bubbles towards the bottom of the tank, and, by doing so, the carriers 2 on the bottom of the tank are blown upward for being better distributed.

Figure 3:
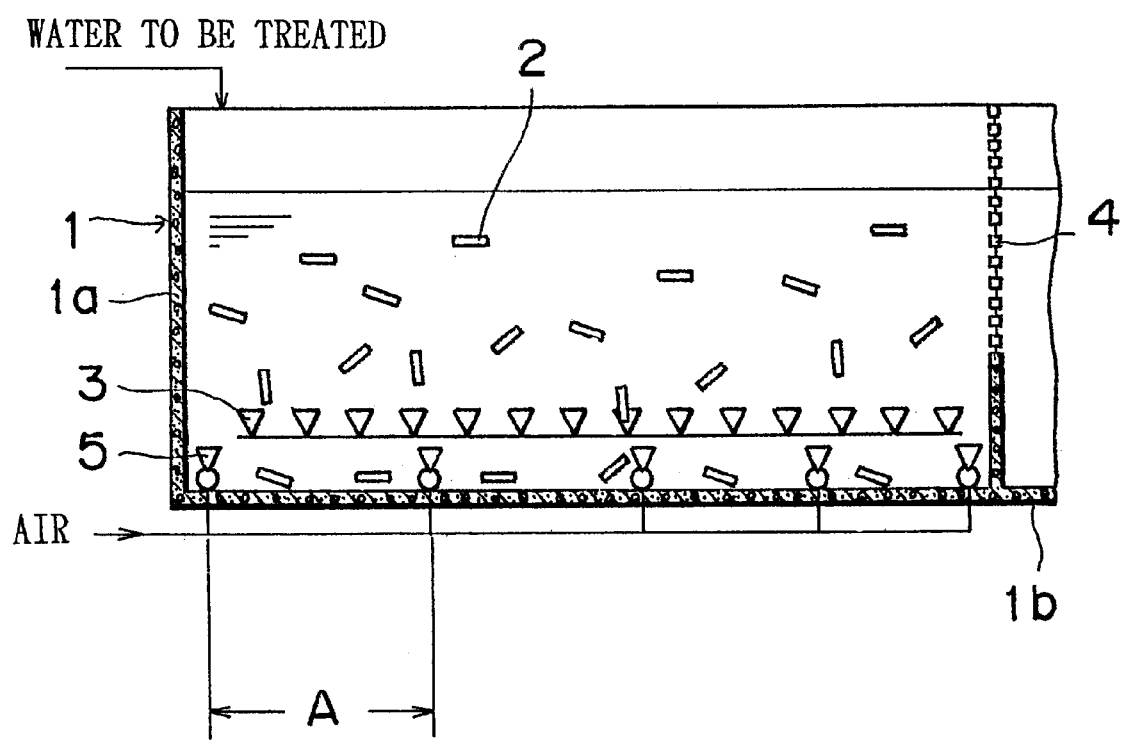
FIG. 3 is a cross sectional view schematically illustrating the waste water treatment plant of another example of the first embodiment of the present invention.

Further, as shown in FIG. 3, a plurality of air bubble generators 5 may be installed on the bottom of the aeration tank 1 in the direction of its width under a plurality of the air blowers 3. When the interval A of the air bubble generators 5 is set to 2 m to 20 m, preferably to 2 m to 10 m, a flow speed of the water sufficient to liquidize the carriers 2 throughout the bottom of the tank can be obtained. Of course, however, the arrangement of the air bubble generators 5 is not limited to that shown in FIG. 3, and so they may be arranged parallel to the direction of the flow of the water to be treated.

Further, though not shown in any of the figures, the air bubble generators 5 are required to be provided with blowers for supplying the air, but such blowers may be substituted by the air blowers provided for the treatment of the water. When altering the aeration tank of existing sludge activation plant into an aeration tank designed for using the carriers, new blowers may be provided in addition to the air bubble generators for spreading the carriers. When altering, in this way, an existing aeration tank into an aeration tank for using the carriers, either large air bubble generator or fine air bubble generator may be selected in consideration of the amount of sludge load, maintenance policy or the age of the plant, that is, whether the plant is existing one or one to be newly constructed.

Embodiment

Next, the effectiveness of each of the embodiments shown in FIGS. 1A through FIG. 3 will be described below by referring to the following embodiments. For the purpose of this comparative experiment for the effectiveness, the embodiment of the waste water treatment plant shown in FIGS. 2A and 2B will be compared with the waste water treatment plant without air bubble generators 5 shown in FIGS. 10A and 10B, and the result of the comparison will be described below.

Each of these waste water treatment plants comprise an aeration tank same as that of the other plant and air bubble generators having air blowing capacity of 100 1/min./m. Each of the waste water treatment plants is supplied with the waste water taken from the settling tanks connected with the plants and having same form and capacity sufficient for water area load of 10 m/day or less. Table 1 shows the conditions of the treated water, while Table 2 shows the average values of the flow speeds of the water to be treated in three directions, namely, the directions of X-axis, Y-axis and Z-axis.

Conditions of Waste Water To be Treated [Table 1]

|     | Concentration (mg/l) |
| --- | --- |
| BOD | 102 |
| COD | 74 |

Conditions of Water Treated by using Air Bubble Generators and Those of Water Treated without using Air Bubble Generators and Average Water Flow Speeds at Bottom of Tank under Air Blower [Table 2]

| Air Bubble Generator | Used (Present Invention) | Not Used (Prior Art) |
| --- | --- | --- |
| Treated water S-BOD (mg/l) | 5 | 9 |
| Treated water S-COD (mg/l) | 8 | 12 |
| Average flow speed of water under air blower (cm/sec.) | 6.1 | 0.9 |

As seen from Table 2, the present embodiment has proved that a better treatment result can be obtained by providing the air bubble generators under the air blower. Also; it has been found that, in the case of the conventional waste water treatment plant not provided with the air bubble generators, the result of the observation through a side wall of a transparent vinyl chloride aeration tank indicated that the precipitation of the mixture of the carriers and the sludge had occurred on all over the area of the bottom of the tank under the air blower. As seen from Table 2, in the case of the present embodiment, it has been found that an average flow speed of the water can be increased to an extent sufficient to liquidize the carriers under the air blower.

Embodiment 2

FIGS. 4A through FIG. 6 show the waste water treatment method and plant as the embodiments of the present invention, which will be discussed below referring to the relevant drawings. The embodiment 2 relates to the waste water treatment plant incorporating submerged stirrer.

Figure 4A:
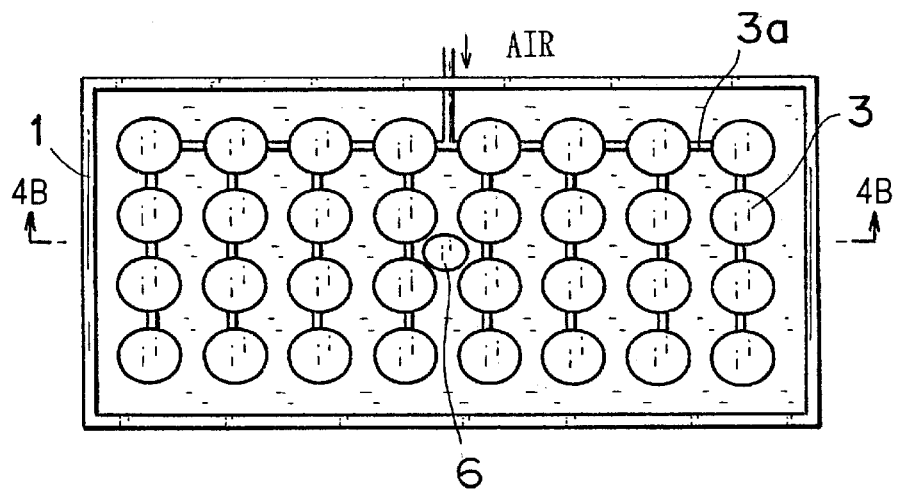
FIG. 4A is a plan view showing a schematic diagram illustrating a waste water treatment plant of a second embodiment of the present invention.
Figure 4B:
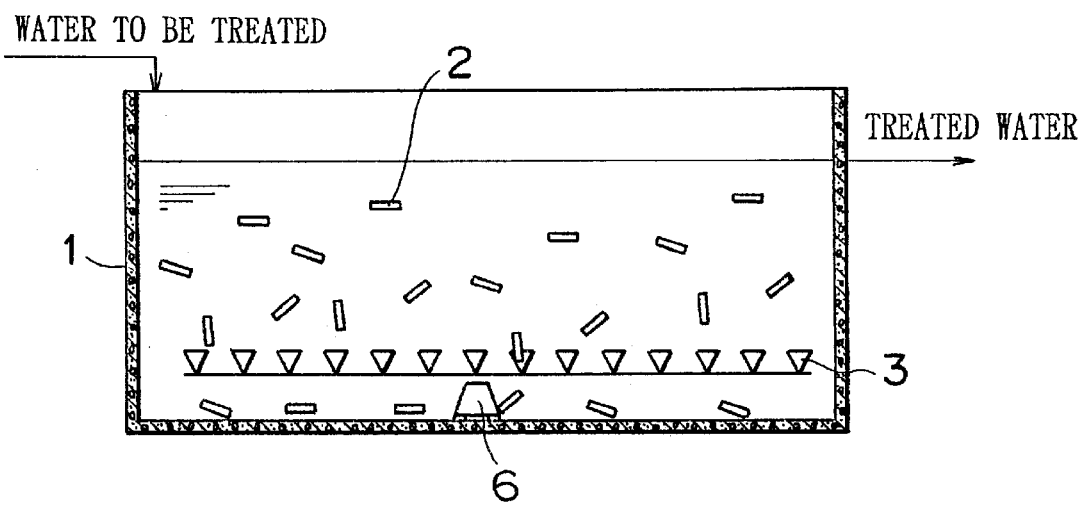
FIG. 4B is a sectional view along X-Y line of FIG. 4B.

FIGS. 4A and 4B are schematic diagrams illustrating a waste water treatment plant as an embodiment of the present invention, wherein FIG. 4A is a plan view and FIG. 4B is a sectional view along X-Y line. As shown in these figures, the waste water treatment plant comprises an aeration tank 1 containing the immobilized microorganism carriers, oxygen-supplying air blowers 3, an air blowing pipe 3a, for connecting the air blowers and for supplying blown air covering all over the bottom of the aeration tank 1, and submerged stirrer installed substantially at the center of the bottom of the aeration tank 1 under the air blower 3. As explained above, the immobilized microorganism carriers 2 are granular substance mainly consisting of inorganic substance and designed for inclusively or bindingly immobilizing the microorganism.

Figure 5A:
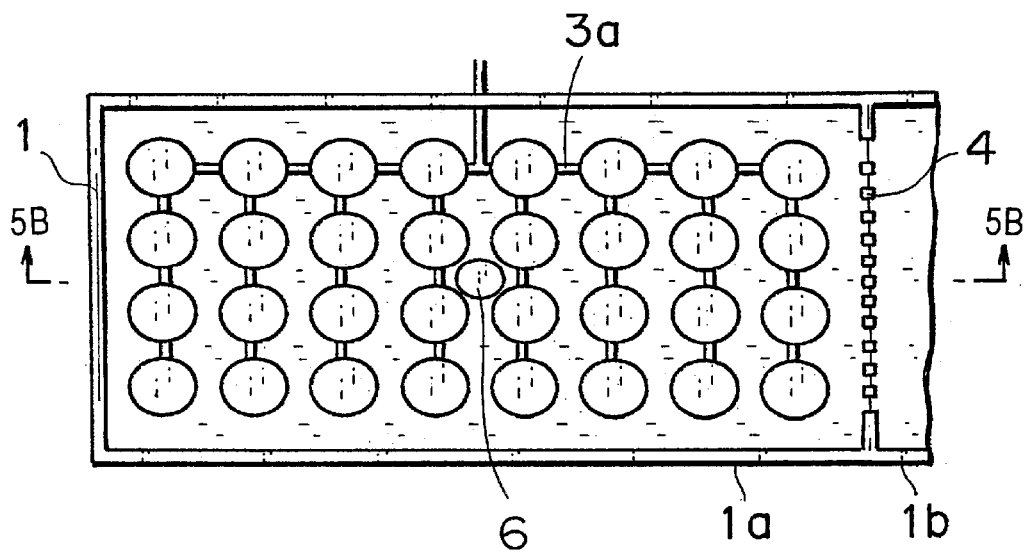
FIG. 5A is a plan view showing a schematic diagram illustrating an aeration tank with subunit as another example of the second embodiment of the present invention.
Figure 5B:
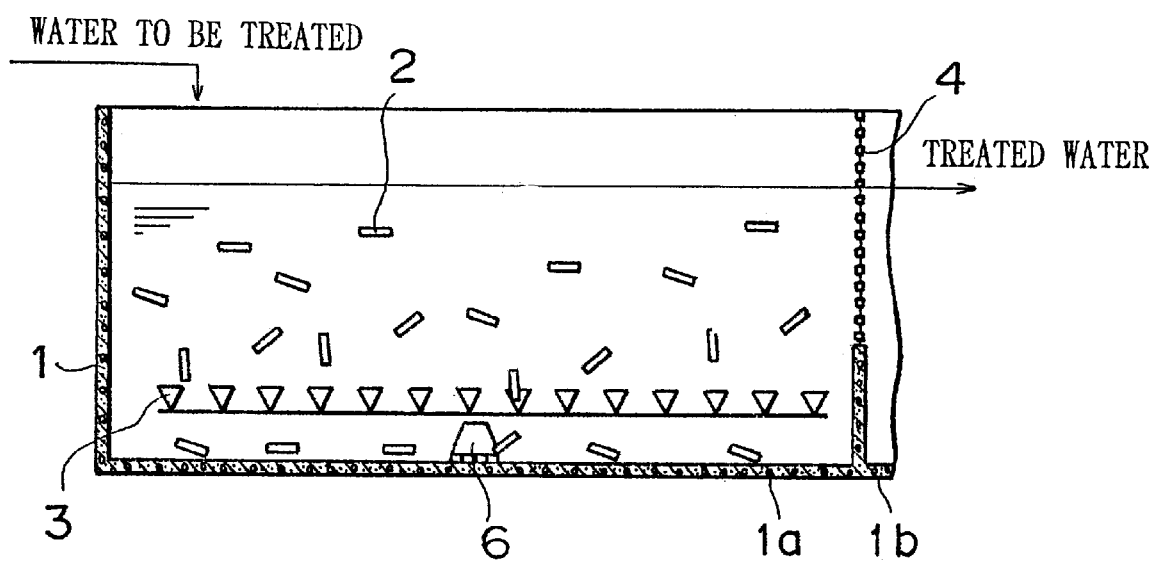
FIG. 5B is a sectional view along X-Y line of FIG. 5A.

FIGS. 5A and 5B are schematic diagrams illustrating another example of the embodiment 2, wherein FIG. 5A is a plan view and FIG. 5B is a sectional view along X-Y line. As shown in these figures, the waste water treatment plant has the aeration tank 1 comprising subunits 1a and 1b. The outlet of the aeration tank provided in the boundary of the subunits 1a and 1b is included in a partition wall 4 including the screen for separating the carriers. The subunit 1a is a subunit of the aeration tank. The air blowers and the submerged stirrer are installed to the conditions same as those shown in FIGS. 4A and 4B.

These waste water treatment plants according to the embodiment 2 comprises an aeration tank of overall air blowing type with the air blowers installed all over the bottom of the subunit 1a of the aeration tank in order to maintain the environment suited for the growth of the microorganism on the carriers suspendibly distributed in the water to be treated in the tank by supplying the air from the air blowers 3. The submerged stirrer 6 creates the flow of water for preventing the carriers 2 from precipitating on the bottom of the tank. The submerged stirrer 6 is installed in the space under the air blowers 3 at a level, 200 mm to 600 mm from the bottom of the tank, so that the submerged stirrer 6 can create the flow of water for sufficiently liquidizing the carriers 2 under the air blowers 3 to prevent the carriers 2 from precipitating under the blowers 3.

The submerged stirrer 6 is required to be capable of creating the water flow speed sufficient for effectively liquidizing the carriers 2 under the air blowers 3 and is also required to be capable of drawing the water to be treated including the carriers 2 suspended in the water to be treated on the bottom of the tank and subsequently blowing the water to be treated upward for stirring the water or blowing downward the portion of the water to be treated above the stirrer 6 to create the water flow speed sufficient for effective distribution of the carriers 2.

Further, where the aeration tank 1 or the subunit 1a of the aeration tank, the subunit 1a being joined with the aeration tank 1 through the partition wall 4 including the screen capable of separating the carriers 2, is within 2 m to 20 m long and wide, as shown in FIGS. 4A, 4B and 5A, 5B, the submerged stirrer 6 is able to create a sufficient water flow when installed substantially at the center of the bottom of the tank.

Figure 6:
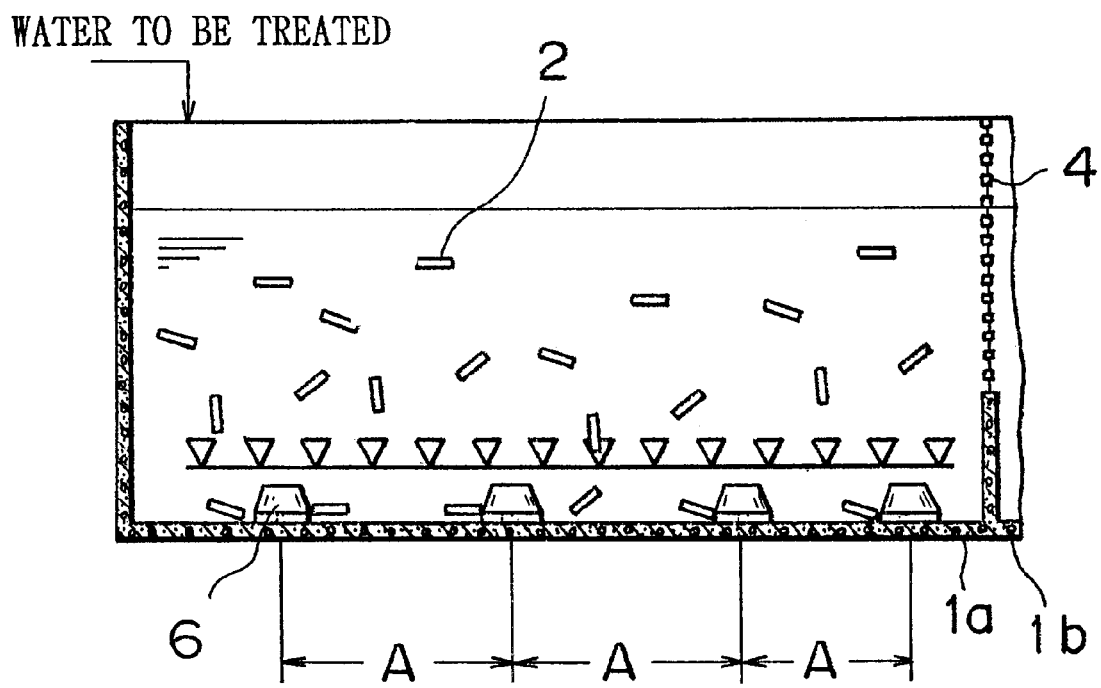
FIG. 6 is a sectional view schematically illustrating further another example of the second embodiment of the present invention.

Further, where the aeration tank has a relatively large cubic volume by having a length and a width, 2 m to 20 m or more, as shown in FIG. 6, the intervals A of the stirrers 6 shall be 2 m to 20 m, preferably 5 m to 10 m. By arranging the stirrers 6 at such intervals, it becomes possible to obtain a water flow speed sufficient for liquidizing the carriers 2 on all over the bottom of the tank under the air blowers. Further, the number (of the submerged stirrers) may be (varied) depending on the area of the bottom of the aeration tank. Or, one submerged stirrer 5 may be installed in each of predetermined areas.

Embodiment

Next, the effect of the embodiment 2 will be discussed in comparison with that of the prior art. This embodiment refers to the aeration tank of overall air blowing type with the submerged stirrer 6 installed at the center of the bottom of the tank, which constitute the waste water treatment plant shown in FIGS. 5A and 5B. With this submerged stirrer 6 the water flow having a sufficient speed is created almost all over the bottom of the tank to prevent the carriers 2 from precipitating.

Figure 10A:
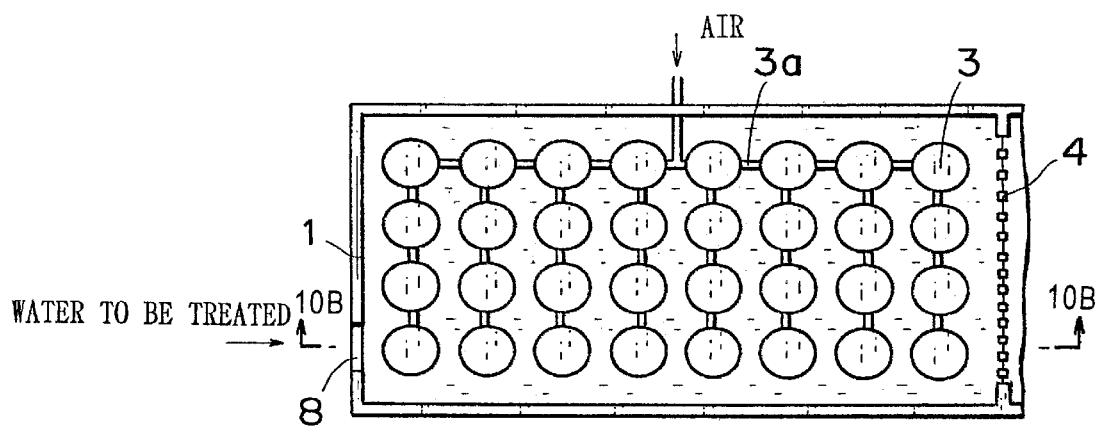
FIG. 10A is a plan view showing an example of aeration tank of conventional waste water treatment plant.
Figure 10B:
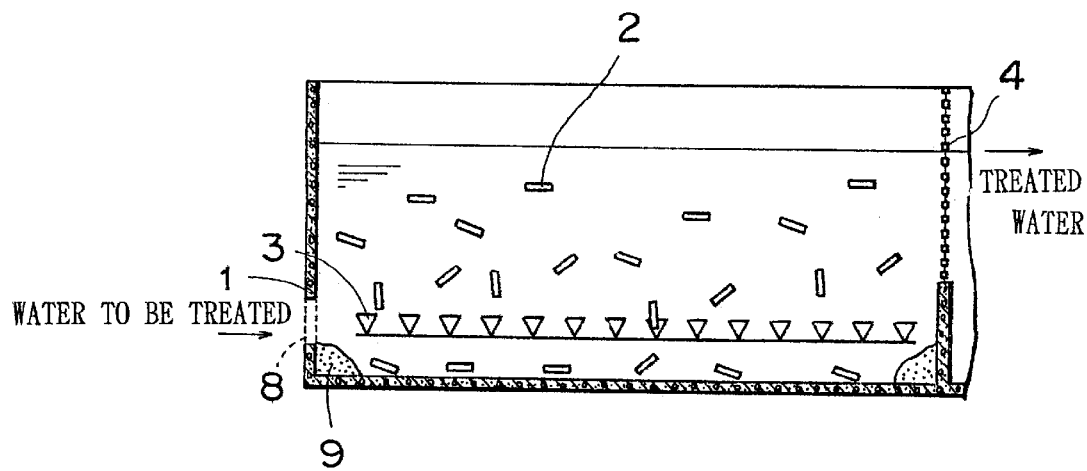
FIG. 10B is a sectional view along X-Y line of FIG. 10A.

The effect of the present embodiment will be discussed based on the result of the comparative experiment with the aeration tank not provided with the submerged stirrer 6 according to the prior art shown in FIGS. 10A and 10B. The aeration tanks to be compared are of same type, each being connected to a settling tank capable of satisfying the water area load of 10 m/day or less for the intake of the water. The conditions of the waste water introduced into the water treatment plant are shown in Table 3. Table 4 shows the comparison between the result of the treatment by the present embodiment and the result of the treatment by the prior art, wherein the average values of flow speeds of the water to be treated in 3 directions, namely X-axis, Y-axis and Z-axis directions, under the air blowers.

Conditions of Water To be Treated [Table 3]

|  | Concentration (mg/l) |
| --- | --- |
| BOD | 102 |
| S-BOD | 84 |
| COD | 74 |
| S-COD | 61 |

Conditions of Treated Water depending on whether Submerged Stirrer is used or not and Average Flow Seeds of Water on the Bottom under Air Blower [Table 4]

| Submerged Stirrer | Provided (Present Invention) | Not Provided (Prior Art) |
| --- | --- | --- |
| Treated water: S-BOD (mg/l) | 5 | 9 |
| Treated water: S-COD (mg/l) | 8 | 12 |
| Average water flow speed under air blower (cm/sec.) | 10.5 | 0.9 |

The effect of the present invention is obvious from the data shown in Table 4. With the present embodiment it has been proved that a better result of waste water treatment can be obtained by providing the submerged stirrer under the air blower. In the case of the prior art not provided with the air bubble generator, which is compared with the present embodiment, the precipitation of the mixture of the carriers and sludge covering all over the bottom of the tank has been found by when observed through the side wall of an experimental transparent vinyl chloride tank. As seen from Table 5, it has been found that the average water flow speed under the air blower can be increased to sufficiently liquidize the carriers according to the present embodiment.

Embodiment 3

FIGS. 7A through 9B show the waste water treatment method and plant as the embodiment of the present invention, and the description thereof will be given below by referring to the relevant drawings.

Figure 7A:
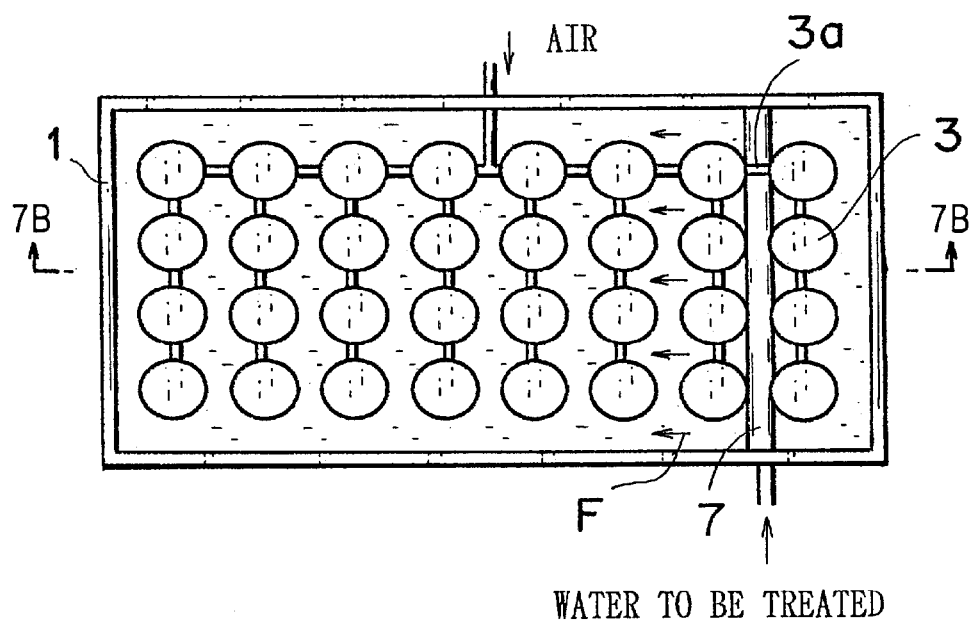
FIG. 7A is a plan view showing a schematic diagram illustrating the waste water treatment plant of a third embodiment of the present invention.
Figure 7B:
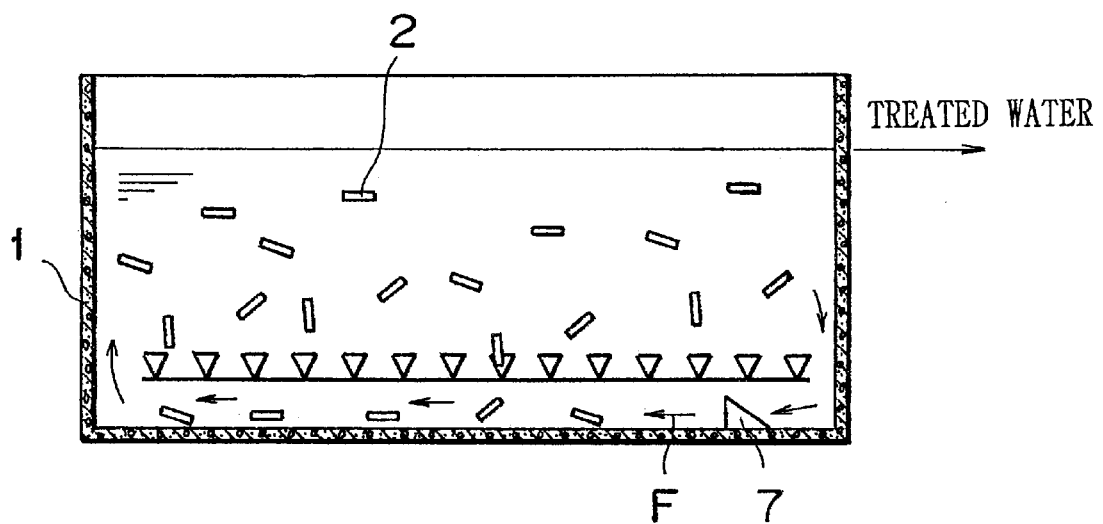
FIG. 7B is a sectional view along X-Y line of FIG. 7A.

FIGS. 7A and 7B are schematic diagrams of a waste water treatment plant as an embodiment of the present invention, wherein FIG. 7A is a plan view and FIG. 7B is a sectional view along X-Y line. As shown in these figures, the waste water treatment plant comprises an aeration tank 1, containing the immobilized microorganism carriers 2, oxygen-supplying air blowers 3, an air blowing pipe 3a, connecting the air blowers for supplying the air covering almost all over the bottom of the aeration tank 1, and a supply pipe 7, installed on the bottom of the aeration tank 1. The immobilized microorganism carriers 2 are of granular substance mainly consisting of an organic macromolecular substance or inorganic substance and are designed for inclusively or bindingly immobilize the microorganism. The supply pipe 7 is provided with a number of water outlets for allowing the outflow of the water to be treated and is installed orthogonal to the direction of the flow of the treated water in the space under the air blowers 3 at a level of 200 mm to 600 mm from the bottom of the aeration tank. The water outlets of the supply pipe 7 are opened so that the water to be treated can be discharged in the direction reverse to the direction of the flow of the treated water. In FIGS. 7A and 7B, an arrow F indicates the direction of the flow of the water. Further, the supply pipe 7 is installed inclining towards the direction of the flow of the treated water so as not to disturb the flow of the circulating water.

Figure 8A:
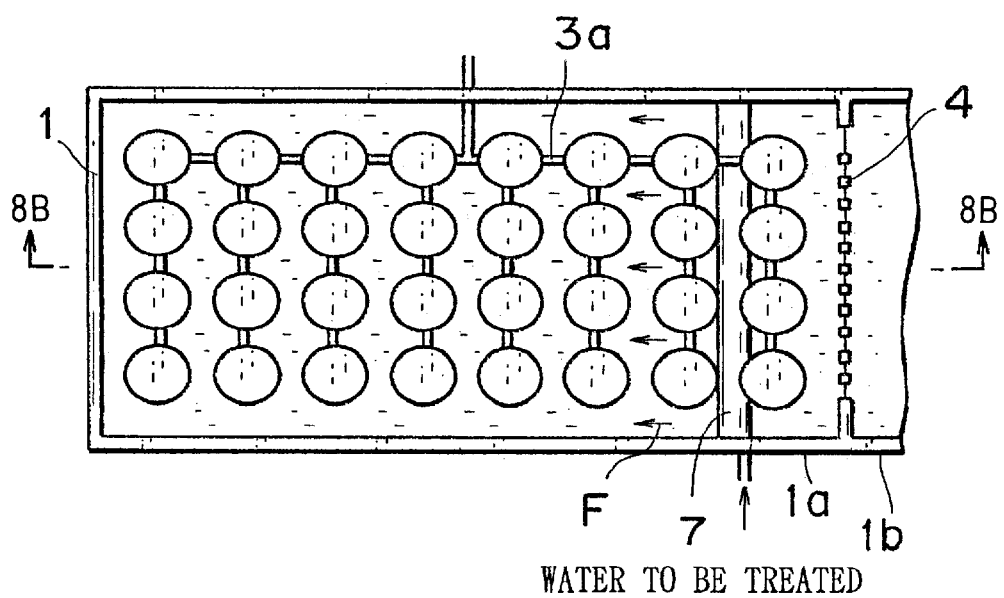
FIG. 8 is a plan view showing a schematic diagram illustrating another example of the third embodiment of the present invention.
FIG. 8B is a sectional view of the third embodiment of FIG. 8A.
Figure 8B:
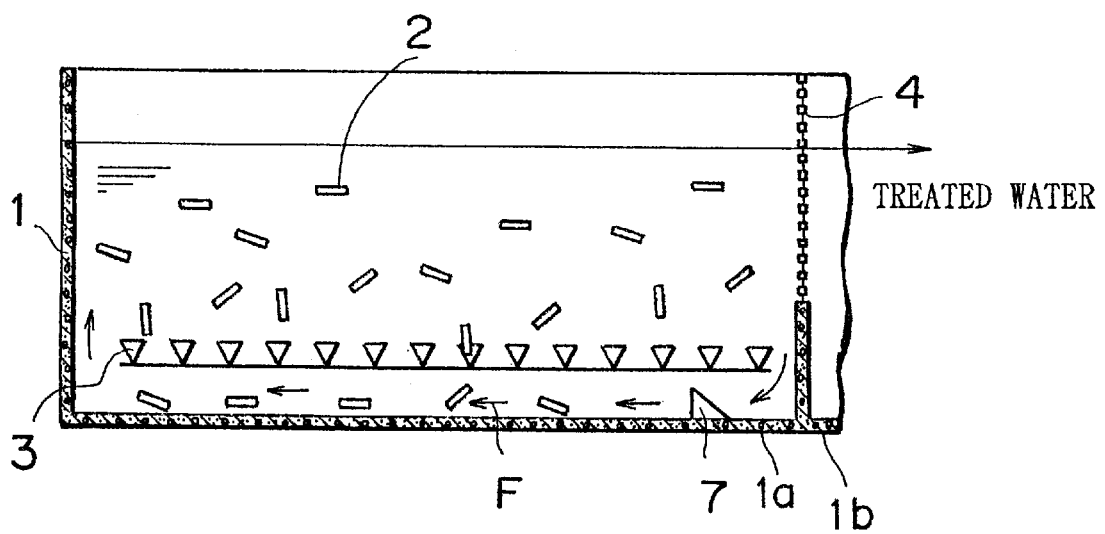

FIGS. 8A and 8B are schematic diagrams showing a waste water treatment plant as another embodiment of the present invention, wherein FIG. 8A is a plan view and FIG. 8B is a sectional view along X-Y line. As shown in these figures, the waste water treatment plant has an aeration tank 1 comprising subunits 1a and 1b. The treated water outlet is provided a the boundary between the subunit 1a and subunit 1b, the boundary being constituted of a partition wall 4 including the screen for separating the carriers 2 from the water to be treated, and the subunit 1a is a subunit of the aeration tank. Further, the air blowers 3 and the supply pipe 7 are installed to the conditions same as those shown in FIGS. 7A and 7B.

The waste water treatment plant according to each of these embodiments is of the overall air blowing type comprising the aeration tank 1 or the subunit 1a of the aeration tank, joined with the aeration tank through the partition wall 4 including the screen for separating the carriers, and the air blower 3 installed on all over the bottom of the aeration tank 1 or the subunit 1a of the aeration tank 1 so that an environment suited for growing the microorganism with the carriers 2 dispersedly suspended in the waste water to be treated in the tank by supplying the air from the air blowers 3. When the water to be treated is discharged from the supply pipe 7 to flow along the bottom surface of the tank, this flow creates a water flow or circulating water flow to prevent the carriers 2 from precipitating on the bottom of the tank.

Further, when the aeration tank 1, into which the carriers 2 are supplied, or the subunit 1a of the aeration tank, joined with the aeration tank 1 through the partition wall 4 including the screen for separating the carrier 2, is within 2 m to 20 m long and wide, a sufficient flow of water or circulating water flow can be created within the tank by installing the supply pipe 7 near the side wall in the direction of the flow of the treated water as shown in FIGS. 7A, 7B and FIGS. 8A and 8B. Thus, with this waste water treatment tank, the flow of water sufficient to liquidize the carriers 2 can be obtained.

Figure 9A:
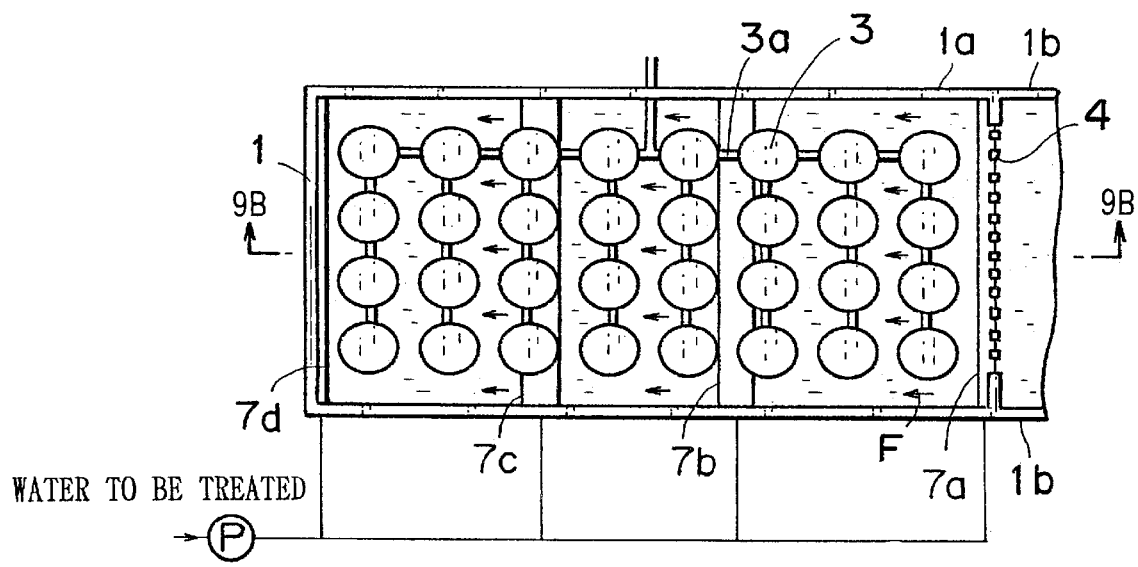
FIG. 9A is a plan view showing a schematic view illustrating further another example of the third embodiment of the present invention.
Figure 9B:
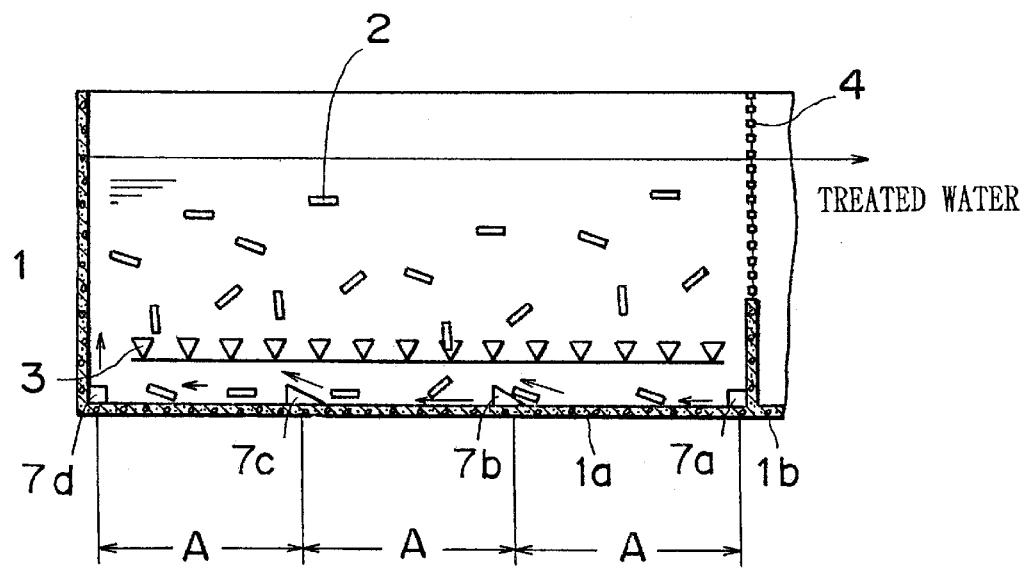
FIG. 9B is a sectional view of FIG. 9A.

Further, when the aeration tank has a relatively large cubic volume by having a length and a width of 2 m to 20 m or more, supply pipes 7a through 7c are installed under the air blowers 3 at intervals of A, 2 m to 20 m, preferably 5 m to 10 m, as shown in FIGS. 9A and 9B. By installing the supply pipes at such intervals, a water flow speed sufficient for liquidizing the carriers 2 under the air blowers 3 arranged covering all over the bottom of the tank.

As described in the foregoing, as shown in FIGS. 8A, 8B and 9A, 9B, the waste water treatment method according to the present embodiment employs a waste water treatment plant comprising the aeration tank 1 containing the carriers 2 for growing microorganism or the subunit 1a of the aeration tank 1 joined with the aeration tank through the partition wall 4 including the screen for separating the carriers 2, the oxygen-supplying air blower 3 and the supply pipe 7 installed under the air blower 3, wherein the water to be treated is made to flow into the tank from the supply pipe 7 to create the flow of water or the flow of circulating water to prevent the precipitation of the carriers 2 under the air blowers 3. Further, the direction of the water flowing into the tank to flow over the tank bottom or the flow of circulating water is set reverse to the direction of the flow of the treated water.

Embodiment

Next, the effect of the present invention will be discussed by comparing the present embodiment with the prior art. The present embodiment relates to an overall air blowing type aeration tank, equivalent to that of the waste water treatment plant as is shown in FIGS. 9A and 9B with the supply pipe 7 provided at the bottom of the tank. Further, the present embodiment is designed so that the water to be treated is discharged from the supply pipe 7 in the direction reverse to the direction of the flow of the treated water thereby to generate the flow of water substantially covering all over the bottom surface of the tank to prevent the precipitation of the carriers 2. The effect of the present embodiment will be discussed referring to the result of comparative experiment between the present embodiment and the prior art which is not provided with the supply pipe for stirring the water to be treated as shown in FIG. 10A and 10B. For the comparative experiment, the waste water treatment plants of an identical design, including the design of the aeration tanks, are used by connecting the plants respectively to a settling tank capable of satisfying the water area load of 10 m/day or less for introducing the water for testing. The conditions of the waste water in the settling tank are shown in Table 5. Table 6 shows the result of treatment by the present embodiment and that by the prior art, that is, the average values of the flow rates of the water to be treated in three directions, namely the directions of X-axis, Y-axis and Z-axis, under the air blowers.

Conditions of Water To be Treated [Table 5]

|  | Concentration (mg/l) |
| --- | --- |
| S-BOD | 102 |
| S-COD | 74 |

Conditions of Treated Water Depending on Presence or Absence of Flowing Water Introduction into Tank Bottom and Average Water Flow Speeds under Air Blower [Table 6]

| Inflow of flowing water into tank bottom | Available (Present Invention) | Not Available (Prior Art) |
| --- | --- | --- |
| Treated water: S-BOD (mg/l) | 4 | 9 |
| Treated water: S-COD (mg/l) | 7 | 12 |
| Average water flow speed under air blower (cm/sec.) | 5.1 | 0.9 |

The effect of the present invention is obvious from Table 6, proving that a better treatment result can be obtained when the supply pipe is provided under the air blower in order to create the flow of water in the direction reverse to the direction of the flow of the treated water. In the case of the prior art not provided with air bubble generator, with which the comparative experiment was made, the precipitation of the mixture of the carriers and the sludge on all over the area of the bottom the tank under the air blower was observed through the side wall of the experimental aeration tank fabricated from the transparent vinyl chloride. As seen from Table 6, it has been found that with the present embodiment a larger average water flow speed is available under the air blower to sufficiently liquidize the carriers.

Effect of the Invention

First Embodiment of the Invention

The first embodiment of the invention has an advantage that it provides a simple, easy and low-cost waste water treatment method and plant for the treatment of waste water by using the aeration tank containing immobilized microorganism carriers or the subunit of the aeration tank, oxygen-supplying air blower and air bubble generator installed under the oxygen-supplying air blower for creating water flow under the air blower to prevent the precipitation of the carriers under the air blower and another advantage that such method and plant can easily be made available by giving only a minor modification to existing aeration tank or reaction tank.

Further, this embodiment also has further another advantage that the carriers can sufficiently be distributed in the aeration tank so that the space of the aeration tank and the carriers contained therein can be utilized efficiently, whereby not only the aeration tank can be made to operate exerting its designed capacity but also the supplied carriers can be suspendibly distributed to a sufficient extent so that the organic macromolecular substances in the waste water can be treated at a stable rate by utilizing the microorganism settling and growing on the carriers.

Second Embodiment of the Invention

The second embodiment of the invention has an advantage that it provides a simple, easy and low-cost waste water treatment method and plant by using an aeration tank containing immobilized microorganism carriers or the subunit of the aeration tank, oxygen-supplying air blower and submerged stirrer installed under the air blower for creating the water flow under the air blower to prevent the precipitation of the carriers under the air blower and another advantage that such method and plant can easily be made available by giving a minor modification to existing aeration tank or reaction tank.

Further, this embodiment has an advantage that the space of the aeration tank and the whole of the carriers supplied therein can be utilized effectively since the carriers can sufficiently be distributed within the aeration tank, thereby enabling the aeration tank to exert its treatment capacity meeting designed numerical requirements and another advantage that the supplied carriers can be suspendibly distributed so that the waste treatment can be carried out at a stable rate by utilizing the microorganism settling and growing on the supplied carriers.

Third Embodiment of the Invention

The third embodiment of the invention has an advantage that it provides a simple, easy and low-cost waste treatment method and plant by using the aeration tank supplied with the immobilized microorganism or the subunit of the aeration tank, oxygen-supplying air blower and water supply pipe installed under the air blower for creating the flow of water under the air blower by discharging the water to be treated therefrom to prevent the precipitation of the carriers under the air blowers, and another advantage that such method and plant can easily be made available for biological treatment of the waste water by giving a minor modification to the existing aeration tank or reaction tank.

Further, this embodiment has an advantage that the space of the aeration tank and the whole of the supplied carriers can be utilized efficiently as the carriers can be sufficiently distributed in the aeration tank, thereby enabling the aeration tank to exert its treatment capacity meeting the designed numerical requirements, and another advantage that the supplied carriers can be suspendibly distributed to a sufficient extent for biological treatment of the organic macromolecular substances in the waste water at a stable rate by means of the microorganism settling and growing on the carriers.

What is claimed is:

1. A waste water treatment method by using an aeration tank or a sub-unit of an aeration tank containing active microorganism carriers for biological treatment of waster water, said sub-unit of the aeration tank being joined with another sub-unit of the aeration tank to form the aeration tank through a partition wall including a screen for separating the carriers, an oxygen-supplying air blower provided for the aeration tank or the sub-unit of the aeration tank, and an air bubble generator installed under the air blower, wherein a flow of water for liquidizing the carriers under the air blower is created by air bubbles generated by the air bubble generator to prevent the carriers from precipitating under the air blower.

2. A waste water treatment plant comprising an aeration tank or a sub-unit of an aeration tank containing active microorganism carriers for biological treatment of the waste water, said sub-unit of the aeration tank being joined with another sub-unit of the aeration tank to form the aeration tank through a partition wall including a screen for separating the carriers, an oxygen-supplying air blower provided for the aeration tank or the sub-unit of the aeration tank, and an air bubble generator provided under the air blower in order to create a flow of water for liquidizing the carriers under the air blower by air bubbles.

3. A waste water treatment plant according to claim 2, further comprises a plurality of air bubble generators in a direction parallel or orthogonal to the direction of the flow of waste water and along one or two side walls of the aeration tank or the sub-unit of the aeration tank under the air blower.

4. A waste water treatment plant according to claim 3, wherein the plurality of air bubble generators are installed at equal intervals between one of the opposing pairs of the side walls of the aeration tank or the sub-unit of the aeration tank.

5. A waste water treatment plant according to claim 4, wherein the air bubble generators are installed at intervals of 2 m to 10 m between one of the opposing pairs of the side walls of the aeration tank or the sub-unit of the aeration tank.

6. A waste water treatment plant according to claim 2 3, 4 or 5, wherein each air bubble generator is provided with air bubble outlets provided for discharging air bubbles towards the bottom of the aeration tank or the sub-unit of the aeration tank.

7. A waste water treatment method, wherein an oxygen-supplying air blower is provided for an aeration tank or a sub-unit of an aeration tank containing growing microorganism carriers for biological treatment of waste water, said sub-unit of the aeration tank is joined with another sub-unit of the aeration tank to form the aeration tank through a partition wall including a screen for separating the carriers, and a submerged stirrer installed under the air blower creates the flow of water to liquidize the carriers for preventing the carriers from precipitating under the air blower.

8. A waste water treatment plant comprising an aeration tank or a sub-unit of an aeration tank containing carriers for growing microorganisms for biological treatment of waste water, said sub-unit of the aeration tank being joined with another sub-unit of the aeration tank to form the aeration tank through a partition wall including a screen for separating the carriers, an oxygen-supplying air blower provided for the aeration tank or the sub-unit of the aeration tank and a submerged stirrer provided under the air blower.

9. A waste water treatment plant according to claim 8, further comprising a plurality of submerged stirrers installed at intervals of 2 m to 20 m on the bottom of the aeration tank or the sub-unit of the aeration tank.

10. A waste water treatment method by using an aeration tank or a sub-unit of an aeration tank containing growing microorganism carriers for biological treatment of waste water, said sub-unit of the aeration tank being joined with another sub-unit of the aeration tank to form the aeration tank through a partition wall including a screen for separating the carriers, and an oxygen-supplying air blower provided for the aeration tank or the sub-unit of the aeration tank, wherein a supply pipe installed under the air blower supplies the water to be treated into the tank to create a flow of water or a flow of circulating water for liquidizing the carriers under the air blower, thereby preventing the carriers to precipitate under the air blower.

11. A waste water treatment method according to claim 10, wherein a direction of the flow of water along the bottom of the tank or a direction of the flow of circulating water is in reverse to the direction of the flow of treated water.

12. A waste water treatment plant comprising an aeration tank or a sub-unit of an aeration tank containing carriers for growing microorganism for biological treatment of waste water, said sub-unit of the aeration tank being joined with another sub-unit of the aeration tank to form the aeration tank through a partition wall including a screen for separating the carriers, an oxygen -supplying air blower installed under the aeration tank or the sub-unit of the aeration tank and a water supply pipe having a number of outlets for allowing the inflow of water to be treated into the tank and installed under the air blower for creating the flow of water in a direction reverse to the direction of the flow of treated water.

13. A waste water treatment plant according to claim 12, wherein the supply pipe is installed in orthogonal to the direction of the flow of treated water and at intervals of 2 m to 20 m on the bottom of the aeration tank or the sub-unit of the aeration tank along the direction of the flow of treated water.

* * * * *